United States Patent Office 3,257,472
Patented June 21, 1966

3,257,472
DEHYDROHALOGENATION
Carl W. Kruse, Bartlesville, Okla., assignor to Phillips Petroleum Company, a corporation of Delaware
No Drawing. Filed Sept. 10, 1962, Ser. No. 222,625
5 Claims. (Cl. 260—666)

This invention relates to a process for dehydrohalogenation of organic halogen compounds. In one of its aspects, the invention relates to a process for dehydrohalogenation of tertiary-halogenated hydrocarbons using a sulfonated resin catalyst. In another aspect, the invention relates to a process for producing olefinic unsaturation in a compound by dehydrohalogenation of a tertiary-halogenated organic compound by use of a sulfonated resin catalyst.

Various processes are disclosed in the literature for the preparation of olefins. One such process which has been widely used is dehydrohalogenation wherein a hydrogen atom and a chlorine atom are removed from adjacent carbon atoms. While dehydrohalogenation processes for the production of olefins have been applied to the dehydrohalogenation of primary, secondary and tertiary chlorides, many of these processes are non-selective, i.e., all types of chlorides are dehydrohalogenated under the conditions of the process.

Other processes have been described for the preparation of tertiary halides by the reaction of a saturated hydrocarbon containing at least one tertiary carbon atom with a tertiary alkyl halide such as tertiary butyl chloride. These tertiary halides can be dehydrohalogenated by various means, including thermal dehydrohalogenation, and by means of various catalysts. However, both the thermal dehydrohalogenation process and many of the catalytic processes heretofore developed require temperatures sufficiently high to cause many side reactions, such as alkylation, to occur.

It is an object of this invention to provide a new dehydrohalogenation catalyst for the selective dehydrohalogenation of tertiary halides. It is another object of this invention to provide a process for producing olefinic unsaturation in a compound by dehydrohalogenation of tertiary halides. It is a further object of this invention to provide a process for dehydrohalogenation of tertiary alkyl halides and tertiary cycloalkyl halides.

Other aspects, objects and the several advantages of this invention will become apparent to one skilled in the art upon study of this disclosure and the appended claims.

According to this invention, there is provided a process for dehydrohalogenation of tertiary halides which comprises contacting a fluid comprising one of a tertiary alkyl halide, a tertiary cycloalkyl halide, and mixtures thereof with a catalyst comprising a porous acid-type sulfonated resin for a time sufficient to effect dehydrohalogenation, and recovering from the contacting an olefinic product. There is further provided a process for producing olefinic unsaturation in a compound which comprises subjecting a compound selected from the group consisting of tertiary alkyl halide, tertiary cycloalkyl halide, and mixtures thereof to the action of a catalyst comprising a porous acid-type sulfonated resin which is effective for dehydrohalogenation for a time sufficient to effect dehydrohalogenation of the compound.

The sulfonated resins which can be employed as catalysts in the process of this invention are the free-acid types of sulfonated polystyrene resins which have been cross-linked with a cross-linking agent such as divinylbenzene or a similar divinyl compound. One particularly suitable material for use as a dehydrochlorination catalyst is Amberlyst-15, a product of Rohm and Haas Corporation. This material is a strongly acidic, macroreticular, sulfonated styrene-divinylbenzene polymer containing from 4.5 to 5.0 milliequivalents of sulfonic acid per gram of resin. The pores of this material have a size of from 200 to 300 Angstroms and the BET surface area is about 60 square meters per gram. It is estimated that about 50 percent of the acid groups are available on the surface of this resin. The surface area of these materials can be determined by the method of Brunauer-Emmett-Teller, Encyclopedia of Chemical Technology, volume I, pages 210–211, Interscience Encyclopedia, Incorporated, New York (1957).

The above-described catalyst can be used for the selective dehydrochlorination of tertiary alkyl halides and tertiary cycloalkyl halides in the presence of primary and/or secondary halides. The catalyst is particularly useful for the dehydrohalogenation of tertiary chlorides and bromides, and of these two halides, it is most applicable to the dehydrohalogenation of tertiary chlorides. Thus, the process is herein described with particular emphasis on tertiary chlorides. The dehydrochlorination is preferably carried out by contacting one of the tertiary chlorides in the liquid phase with an amount of the catalyst generally ranging from 0.05 to 10 weight percent based on the tertiary chlorides, preferably from 1 to 5 weight percent on the same basis. While the dehydrochlorination is carried out in the liquid phase, it is preferred that the reaction be carried out at about the boiling point of the tertiary chloride being dehydrochlorinated. This can be conveniently carried out in a fractionating column, since the olefin formed by dehydrochlorination will distill overhead as it is formed. Thus, the tertiary chloride to be dehydrochlorinated and the catalyst can be charged to the kettle of a fractionating column, and as dehydrochlorination proceeds, olefin passes overhead and additional tertiary chloride can be charged to the fractionator kettle. The reaction can be carried out batchwise or continuous, and because of the solid nature of the catalyst, it can be conveniently removed from the kettle residue by such means as filtration, decantation, and the like.

As pointed out above, this catalyst is suitable for the dehydrochlorination of tertiary alkyl chlorides and tertiary cycloalkyl chlorides. An example of a tertiary alkyl chloride which can be readily dehydrochlorinated with this catalyst is 2-chloro-2,3-dimethylbutane. The olefin produced in the case is a mixture of 2,3-dimethylbutene-1 and 2,3-dimethylbutene-2. An example of a tertiary cycloalkyl chloride which can be dehydrochlorinated is 1-methyl-1-chlorocyclohexane. The olefin products from this dehydrochlorination would be 1-methylcyclohexene and 1-methylenecyclohexane.

The dehydrohalogenation process of this invention is applicable to the dehydrohalogenation of tertiary alkyl halides and tertiary cycloalkyl halides, particularly the chlorides and bromides, which contain from 4 to about 15 carbon atoms. Some specific examples of compounds which can be dehydrohalogenated are tert-butyl chloride, tert-amyl bromide, 2-chloro-2,3-dimethylbutane, 4-bromo-2,4-dimethylhexane, 2-chloro-2-methylnonane, 2-bromo-2,3,3,4,4,5,5, - heptamethylheptane, 3 - chloro-3-methyltetradecane, 1 - methyl-1-chlorocyclohexane, 1-methyl-1-chlorocyclooctane, 1-methyl-1-chlorodecalin and 1-bromo-1-ethyl-4-n-heptylcyclohexane. The process is carried out at temperatures generally ranging from 75 to 250° C., preferably 100 to 200° C. The specific temperature will usually depend upon the specific compound being dehydrohalogenated and the contact time with the catalyst. Reaction times will generally be less than one hour, more often in the range of a few seconds to 30 minutes. Since the reaction is a liquid phase reaction, the pressure in the reaction zone should be such that the tertiary halide will be a liquid at the pressure and temperature prevailing in the reaction zone, and preferably will be just below its boiling point at these conditions. Such conditions will generally be met by employing pressures of from 50 mm. Hg absolute to 10 atmospheres.

The following specific examples are intended to illustrate the advantages of the present process and to particularly point out the usefulness of the new dehydrochlorination catalyst described herein. However, the examples are not intended to limit the invention to the particular features shown in the examples.

EXAMPLE I

A run was carried out in which 2-chloro-2,3-dimethylbutane was dehydrochlorinated in the presence of a sulfonated resin according to the process of this invention.

The 2 - chloro - 2,3, - dimethylbutane used in this run was prepared by a chlorine exchange reaction between tertiary butyl chloride and 2,3-dimethylbutane in the presence of an aluminum chloride complex catalyst.

In this run, a 25 gram portion (0.208 mol) of 2-chloro-2,3-dimethylbutane was charged to the pot of an 18″ x ¾″ fractionation column packed with glass helices. An external heating source was turned on and the material in the pot was heated to 70° C., at which time 0.6 gram of Amberlyst-15 was charged to the pot. As the olefins were formed by dehydrochlorination, they were removed overhead until the distillate temperature rose above the boiling point of 2,3-dimethyl-2-butene (73° C.). The removal of the olefins was automatically controlled by a Niagara thermo cap relay cap used in conjunction with a magnetic take-off. In two hours, 7.5 grams of distillate were obtained. The distillate contained 1.5 grams of 2,3-dimethylbutene-1, 5.25 grams of 2,3-dimethylbutene-2 and 0.75 gram of 2-chloro-2,3-dimethylbutane. This latter material was probably formed in the overhead condenser by the recombination of olefin with the HCl which was passed overhead through the column. An additional 2.2 grams of 2,3-dimethylbutenes were found in the column hold-up and residue, thus bringing the total per pass yield of olefins to 51 percent at 62 percent conversion of the 2-chloro-2,3-dimethylbutane.

The analyses for determination of yield values were carried out by gas chromatography using a 2′ squalane on Celite column.

EXAMPLE II

A further dehydrochlorination run was carried out in the apparatus of Example I in which 1-methyl-1-chlorocyclohexane was dehydrochlorinated by means of the catalyst of this invention. In this run, 50.1 grams of a mixture containing 65.2 weight percent 1-methyl-1-chlorocyclohexane and 33.4 weight percent of secondary chlorides of methylcyclohexane were charged to the kettle of the distillation column of Example I. The mixture in the kettle was heated to 120° C., and 1.1 grams of Amberlyst-15 were charged to the kettle. The magnetic take-off was set at 114° C. After three hours, 3 overhead cuts had been collected amounting to 20.8 grams, 3.7 grams and 1.3 grams, respectively. The remaining pot residue totaled 13.5 grams.

A first analysis of these materials by gas chromatography was carried out using a 2′ squalane on Celite column. The analyses are as follows:

*Analyses*

[Figures in weight percent]

|  | Cut 1 | Cut 2 | Cut 3 | Pot Residue |
|---|---|---|---|---|
| Secondary olefins | 11.7 | 10.7 | 5.0 | 0.3 |
| 1-methylcyclohexene | 84.3 | 70.2 | 35.8 | 1.0 |
| Tertiary chlorides [1] | 4.0 | 2.1 | 2.0 | |
| Secondary chlorides | | 17.0 | 57.2 | 98.7 |

[1] The tertiary chloride is 1-methyl-1-chlorocyclohexane which probably formed by recombination of tertiary olefin and hydrogen chloride in the overhead condenser.

The analysis with a squalane on Celite column does not distinguish between 1-methylcyclohexene and 1-methylenecyclohexane, and both of these components are reported as 1-methylcyclohexenes above. Accordingly, the materials were analyzed further on a silver nitrate column to more completely identify the olefins present. The tertiary olefins present were found to be 1-methylcyclohexene and 1-methylenecyclohexane, and the total yield of these two materials was 79 percent. A total yield of 11 percent of 3- and 4-methylcyclohexene was found, thus indicating that some isomerization of the olefins occurred in the presence of the catalyst used. The recovery of secondary chlorides, based on the charge was 89 percent, thus indicating that the material balance for this run was fairly reliable. The ultimate yield of olefins based on tertiary chlorides charged and recovered was 93 percent.

Although the preceding examples are concerned with dehydrohalogenation of chlorides, my invention is also applicable to other halides. A further description of Amberylst–15 can be obtained from an article in Industrial and Engineering Chemistry, Product Research and Development issue, vol. I, No. 2, June 1962, pages 140–144.

Reasonable variation and modification are possible within the scope of this disclosure and the appended claims to the invention, the essence of which is that there has been provided a process for dehydrohalogenation of tertiary-halogenated hydrocarbons by use of an acid-type sulfonated resin catalyst.

I claim:

1. A process for selective dehydrohalogenation of tertiary alkyl halides and tertiary cycloalkyl halides and mixtures thereof in the presence of primary or secondary alkyl halides which comprises contacting said admixture with a solid catalyst which remains solid during operation of said process comprising a porous acid-type sulfonated resin for a time sufficient to effect dehydrohalogenation of said tertiary halides, and recovering the resultant olefinic product from said primary or secondary alkyl halides.

2. The process of claim 1 wherein said catalyst comprises a strongly acidic, macroreticular, sulfonated styrene-divinylbenzene copolymer containing from about 4.0 to about 4.5 milliequivalents of sulfonic acid per gram of resin.

3. The process of claim 2 wherein said catalyst is present in an amount of about 1 to about 5 weight percent of the tertiary halide.

4. A process for dehydrohalogenation of 2-chloro-2,3-dimethylbutane in admixture with primary or secondary alkyl halides which comprises contacting said admixture with a catalyst comprising a strongly acidic macroreticular sulfonated styrene divinylbenzene copolymer containing from about 4.0 to about 4.5 milliequivalents of sulfonic acid per gram of resin for a time sufficient to effect dehydrohalogenation of said 2-chloro-2,3-dimethylbutane, and recovering the resultant 2,3-dimethylbutenes from said primary or secondary alkyl halides.

5. A process for selective dehydrohalogenation of 1-methyl-1-chlorocyclohexane in admixture with secondary chlorides of methylcyclohexane which comprises contacting said admixture with a catalyst comprising a strongly acidic macroreticular sulfonated styrene divinylbenzene copolymer containing from about 4.0 to about 4.5 milliequivalents of sulfonic acid per gram of resin for a time sufficient to effect dehydrohalogenation of said 1-methyl-1-chlorocyclohexane, and recovering the resultant 1-methylcyclohexene from said secondary chlorides of methylcyclohexane.

(References on following page)

References Cited by the Examiner

UNITED STATES PATENTS

| | | | |
|---|---|---|---|
| 2,739,990 | 3/1956 | Chipman | 260—663 |
| 2,899,473 | 8/1959 | Le Prince et al. | 260—677 |
| 3,017,441 | 1/1962 | Thomas et al. | 260—671 |
| 3,037,052 | 5/1962 | Bortnick | 260—671 |

OTHER REFERENCES

"Amberlite Ion Exchange," p. 10, Rohm & Haas Co., The Resinous Products Division, Philadelphia (September 1953), Sidney Sussman, Industrial and Eng. Chem., vol. 38, No. 12, pp. 1228–30, 1946.

Nachod et al.: Ion Exchanging Technology, 273–79, Academic Press, New York, 1956.

DELBERT E. GANTZ, *Primary Examiner.*

PAUL M. COUGHLAN, JR., ALPHONSO D. SULLIVAN, *Examiners.*

P. P. GARVIN, L. FORMAN, V. O'KEEFE,
*Assistant Examiners.*